Sept. 21, 1965  B. F. MELVIN  3,207,264
MOBILE SERVICE UNIT
Filed July 16, 1963  5 Sheets-Sheet 1

INVENTOR.
Benjamin F. Melvin

Sept. 21, 1965 B. F. MELVIN 3,207,264
MOBILE SERVICE UNIT
Filed July 16, 1963 5 Sheets-Sheet 5

INVENTOR.
Benjamin F. Melvin 3,207,264
MOBILE SERVICE UNIT
Benjamin F. Melvin, 202 Pacific Ave., East Helena, Mont.
Filed July 16, 1963, Ser. No. 295,556
8 Claims. (Cl. 187—8.41)

This invention relates generally to land vehicles and more particularly to mobile service vans used in connection with the maintenance and repair of various types of vehicular machinery and equipment.

In the past, and at present, the repair and maintenance of vehicles has been limited more or less to permanent, fixed stations such as garages, service stations and the like, to such an extent that persons wishing to have minor repairs or routine maintenance accomplished must either take time off from their regular employment to deliver and retrieve their vehicle or they must do this chore during their off or leisure hours, thereby making the task an even more drudgerous one.

Also in the field of working equipment, such as that used by companies on construction projects, a problem has been over the years the proper maintaining and speedy repair of such equipment in the field to avoid lengthy delays in having such expensive equipment inoperative and therefore, not in use.

A further problem has been found by the military services during exercises and during actual combat in that that temporary repair facilities must be set up in the field and usually this has required very elaborate and expensive semi-permanent shop-type outfits which require time losses in assembling and disassembling as well as requiring the services of skilled technical people. Also when equipment breaks down at a distance from the repair facilities it is necessary to either bring the equipment to the facilities or set up a complete new repair facility on the scene of the broken or disrepaired piece of equipment.

In the past, people have attempted to overcome the above enumerated and similar problems in the field of maintaining and repairing various types of vehicles, but as yet the long felt need has not been fully satisfied by the various devices available. One solution to the problems has been to provide a vehicle for on-sight servicing including facilities for minor repairs and the like. One example of a vehicle for such on-sight servicing is Patent No. 2,765,938 to Addezio in which a vehicle is provided upon which a second vehicle may be pulled with cramped quarters in the first vehicle for repairing and maintaining said second vehicle. By its inherent design, however, this unit could be used only for relatively small vehicles and by necessity would be limited to very minor repairs on vehicles such as automobiles, but would be completely inadequate for maintaining to any great extent larger vehicles or a large volume of business.

The present invention has been developed after many years of studying the inadequacies of present type of fixed or semi-fixed service and repair facilities in not only the automotive industry, but also in the construction and military fields. To meet the need in these diverse fields, a van type of vehicle has been developed which embodies within its interior adequate space for spare repair parts, air-compressors to assist in maintenance and repair work, generator to operate various repair equipment, work benches, adequate work space and various types of allied test and repair equipment which may be needed to perform any and all functions of repair up to major overhaul type of work. Operatively connected to the repair equipment containing van is one or more foldable, vertically adjustable hydraulically, pneumatically or mechanically actuated rack devices for raising and lowering vehicles to and from a position of easy access for the performance of maintenance and repair on said vehicle so that on-sight repair and servicing may be accomplished whether the vehicle being worked on is located in a factory parking lot, a shopping center parking lot, or any other place having a high-density of automobiles, or whether it is in a remote area of a construction project or army maneuver or actual combat.

It is therefore an object of the present invention to provide a mobile service van having one or more adjustable racks mounted on the side of said van for the purpose of assisting in the maintenance and repair of various types of vehicles.

Another object of the present invention is to provide either a hydraulic, pneumatic or mechanical means for raising and lowering such repair racks from loading position to repair position and return to loading position.

A further object of the present invention is to provide means for folding said rack into transport position against the side of said van thereby eliminating the necessity of having to assemble and disassemble a separate rack.

Another object of the present invention is to provide a mobile service van which is completely self-sufficient relative to facilities to maintain and repair various types of vehicles in combination with foldable, vertically adjustable, repair racks.

Other objects and advantages of the present invention will become apparent and obvious from a study of the following description and the accompanying drawings which are merely illustrative of the present invention.

In the drawings:

FIG. 1 is a perspective of the mobile service van of the present invention showing the adjustable raising and lowering racks in folded transport position;

FIG. 2 discloses a cutaway perspective of one side of the mobile van showing the raising and lowering rack in partially folded position;

Figure 1:
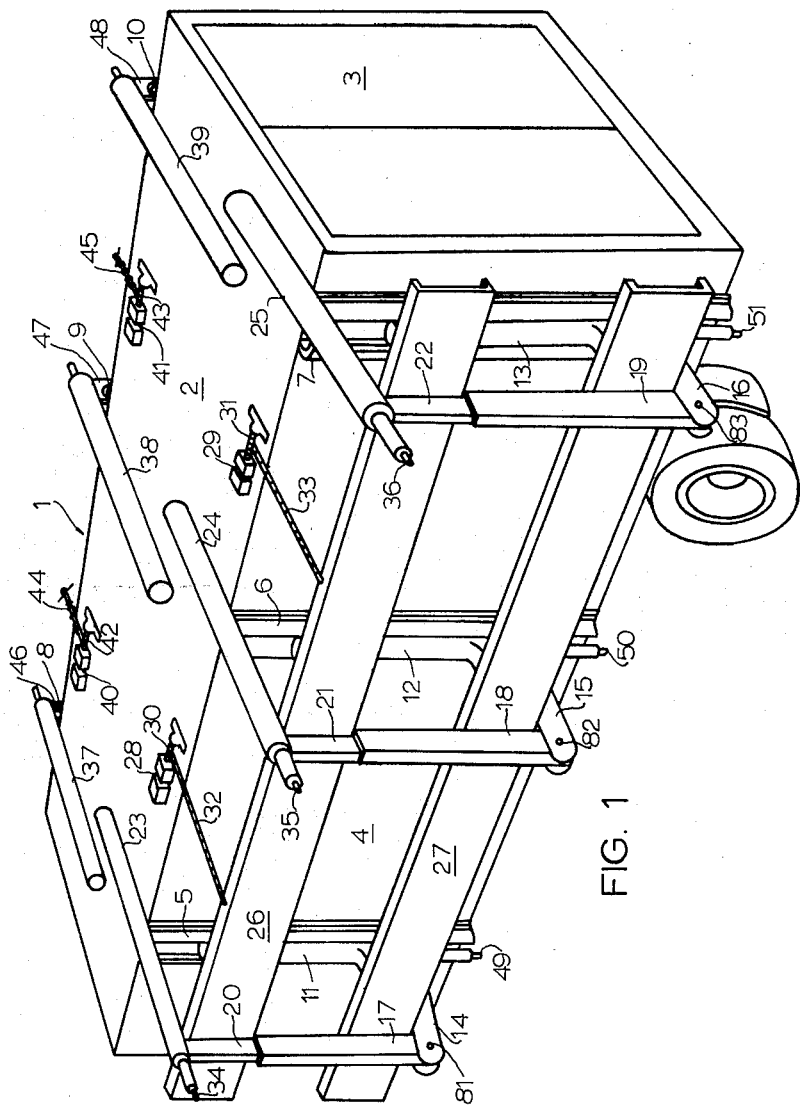

With further reference to the drawings, FIG. 1 discloses a van type of vehicle 1 having a top portion 2, a rear portion 3, a left side portion 4, and a right side portion (not shown) and a front portion (not shown).

Channel members 5, 6 and 7 are vertically mounted on the left side portion 4 of the van 1 with corresponding members 8, 9 and 10 similarly mounted on the right side portion.

Figure 3:
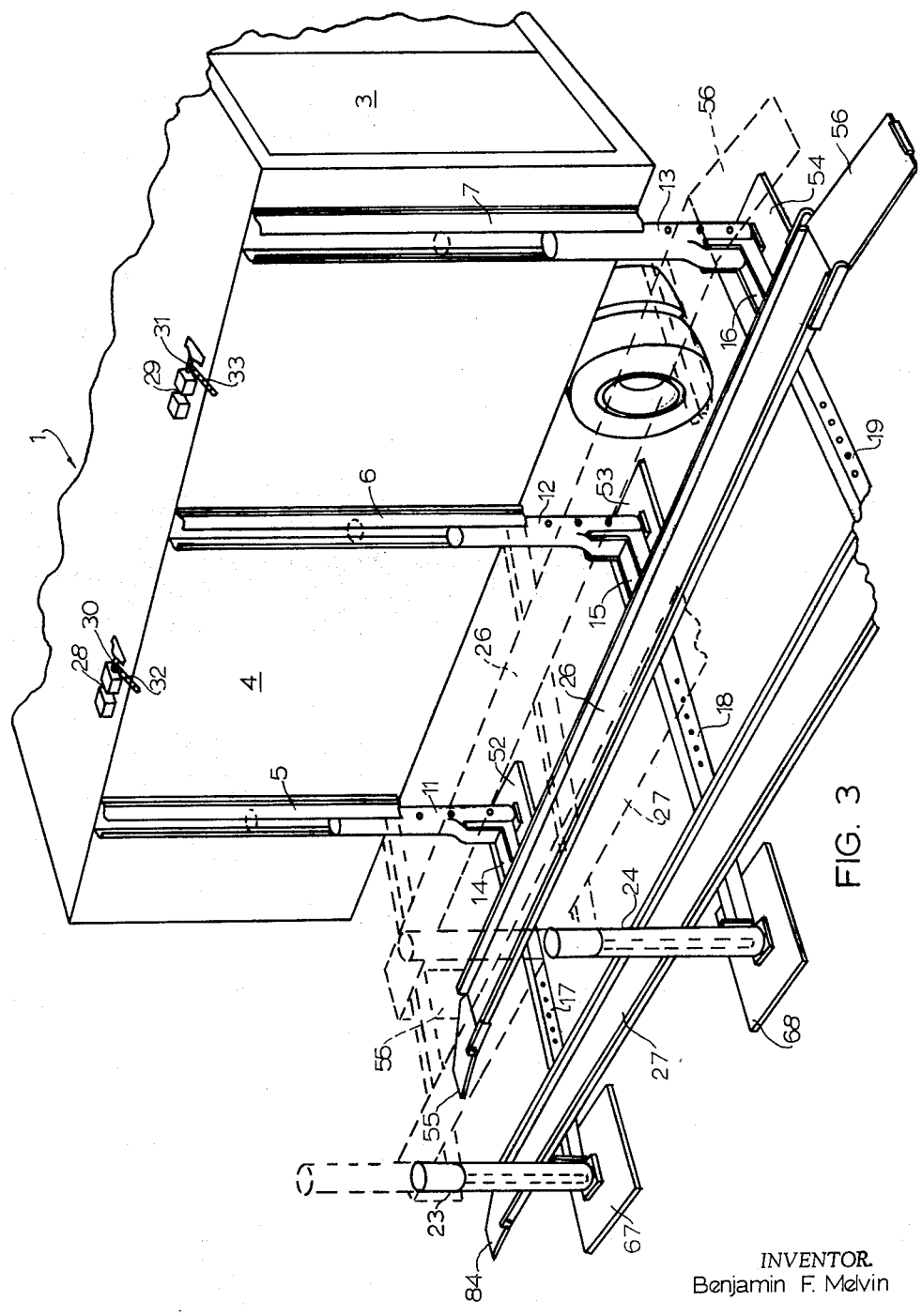
FIG. 3 is a cutaway perspective of the present invention showing the raising and lowering rack in loading position and in working position.

Slidably mounted within the channel members 5, 6 and 7 are slide members 11, 12 and 13 respectively. Operatively mounted within each of said slide members are jack means which have attached on the lower end thereof male portions 49, 50 and 51 for engaging jack support plates 52, 53 and 54. (FIG. 3). Corresponding structure is similarly mounted within the channel members 8, 9 and 10 of the right side of said van 1. Horizontally disposed bracket means 14, 15 and 16 are fixedly attached to said slide members 11, 12 and 13.

Pivotably connected to bracket means 14, 15 and 16 are sleeve members 17, 18 and 19. Slidably mounted within said sleeves are girders 20, 21 and 22. Fixedly mounted to one end of girders 20, 21 and 22 and at approximate right angles thereto are jack means 23, 24 and 25.

A vehicle support channel or platform 26 is provided in fixed perpendicular relation to girders 20, 21 and 22. A second vehicle support channel 27 is provided in parallel relation to support channel 26 and fixedly connected to sleeves 17, 18 and 19.

Raising and lowering means for the above described rack are provided including rotative power sources 28 and 29 connected to cable drums 30 and 31, all of which are mounted on the top portion 2 of the van 1. Releasably connected at one end to support channel 26 and windedly secured to drums 30 and 31 are cables 32 and 33.

Figure 4:
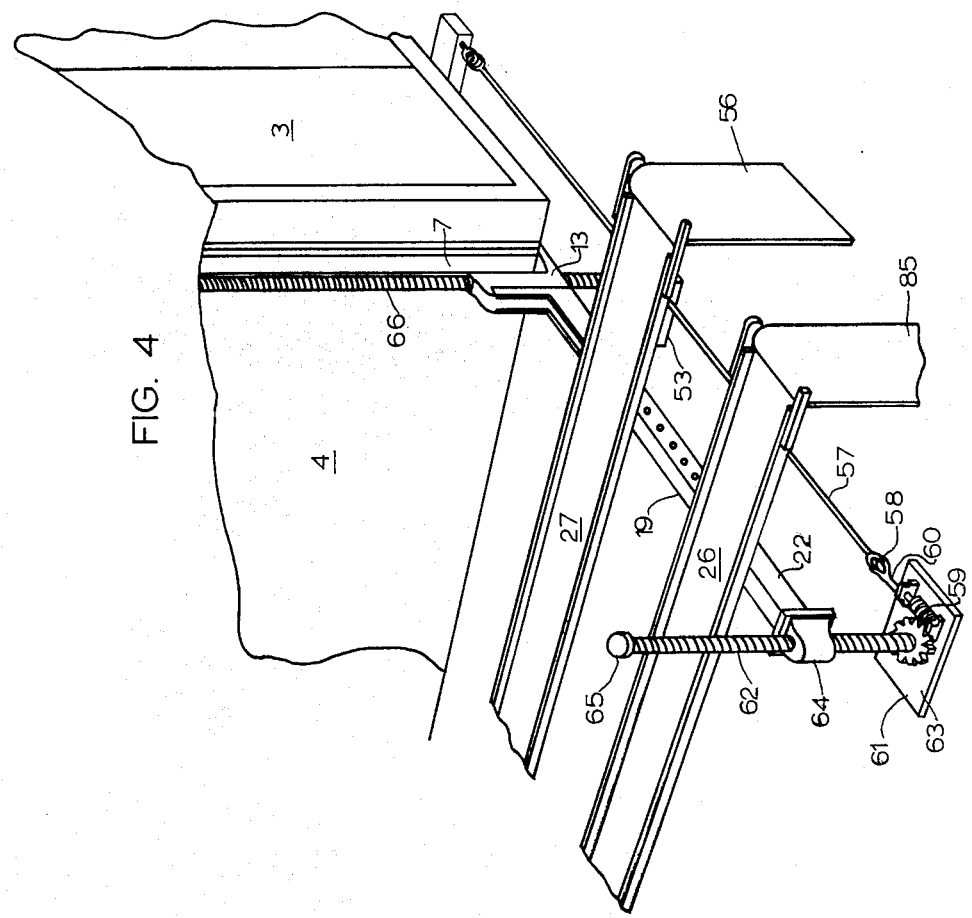
FIG. 4 is a cutaway perspective disclosing a mechanical means of raising and lowering the repair rack.
Figure 5:
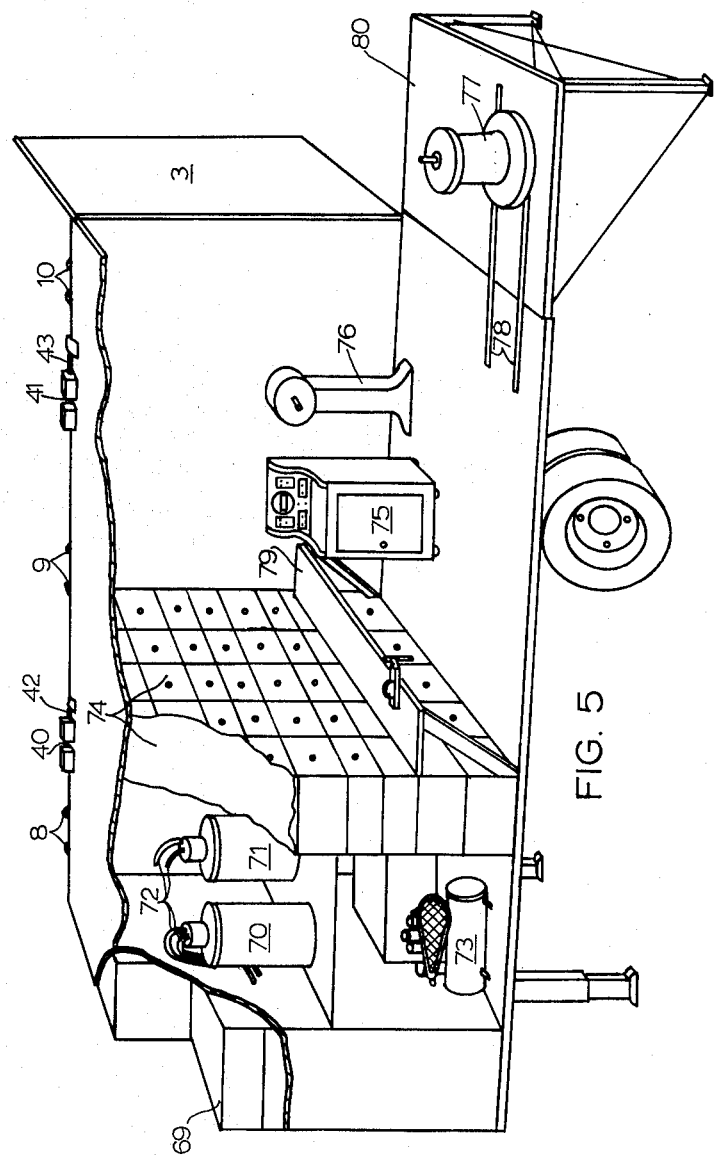
FIG. 5 is a cutaway perspective of the mobile service van showing one possible arrangement of the various equipment located within such van.

At one end of the jack means 23, 24 and 25 are male portions 34, 35 and 36 for engaging corresponding female portions (not shown) of jack support plates 67, 68 and 63 respectively. (See FIGS. 3 and 4).

Corresponding to the structure mounted on the left side portion 4 of the van 1 hereinabove described is similar structure mounted on the right side portion of said van which, as disclosed in FIG. 1, includes jack means 37, 38 and 39, raising and lowering power means 40 and 41, cable drums 42 and 43, cables 44 and 45, and girders 46, 47 and 48.

Figure 2:
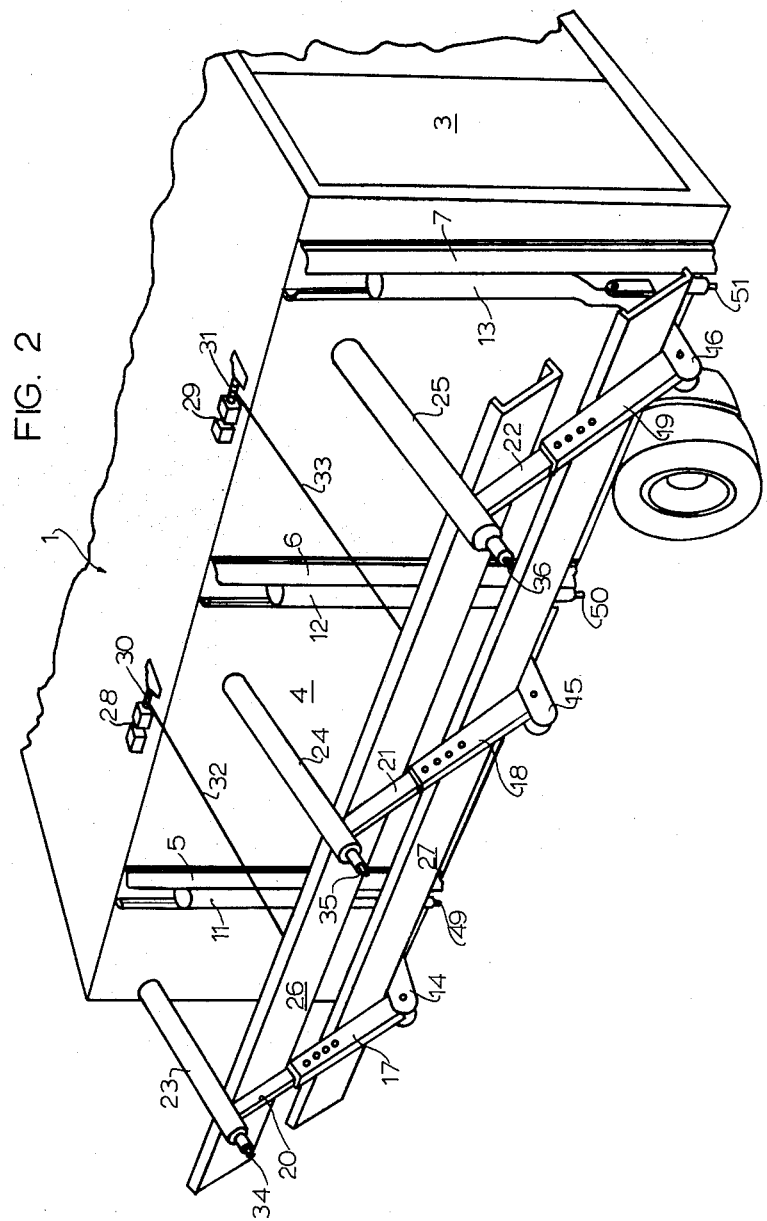

Once the van is placed in the desired location the rack which has been folded against the side of the van during transportation is lowered from perpendicular to horizontal position, such lowering operation being disclosed in intermediate position in FIG. 2. As the rack is lowered to such horizontal position jack support plates are placed under the jacks so that the male portions of the various jack means will insertedly engage said plates.

In one embodiment of the present invention hydraulic actuating means (not shown) are incorporated into the jack means so that upon proper manipulation of the hydraulic controls (not shown) the rack including vehicle support channels 26 and 27 may be raised from the lowered position disclosed in FIG. 3 to the raised position disclosed by dotted lines in said FIG. 3.

Ramp members 55 and 56 are provided at either end of support channel 27 to assist in loading and unloading of vehicles on and off said support channel and are well known in the art. Similar ramp members are located at either end of channel member 26.

Any number of various means may be used to raise and lower vehicles which are driven or otherwise placed with their wheels or tracks on vehicle support channels 26 and 27 of the raising and lowering rack mounted on the side of van 1. In addition to various hydraulic means which may be used a mechanical means such as that disclosed in FIG. 4 may be incorporated into the jack means in the place of such hydraulic means.

In the specific embodiment of the mechanical means, a drive shaft 57 is provided having a universal joint 58 at one end thereof and a means for rotating said shaft (not shown). A helical or worm gear 59 is connected to universal joint 58 by shaft 60. Operatively engaging said worm gear is pinion gear 61 fixedly connected to helically threaded shaft 62. Pinion 61 is rotatably mounted on a bearing surface (not shown) of jack plate 63. An internally threaded bearing member 64 is provided on the end of girder 22 for rotatably receiving the helically threaded shaft 62. A helically threaded shaft 66 corresponding to shaft 62 threadedly engages slide member 13 which is capable of recipatory motion within channel member 7. If desired a bulbous portion 65 may be located at the upper end of helical shaft 62 to prevent the rack from being raised beyond the limits of safety.

The same or similar mechanical jacking means may be provided at the ends of girders 20 and 21 as well as operatively connected to slide members 11 and 12. Also it is considered obvious to one skilled in the art that interconnecting mechanical means such as drive shafts, chains, belts, cables and the like may be used to inter-connect all of the various jacking means so that the rack supported thereby may be raised and lowered at a uniform rate and therefore may be maintained at a constant level.

One proposed interior arrangement for the van of the present invention would be to have bins 69 for the storage of parts and similar materials located in the forward portion of the van 1 and accessible from the front side of said van. Located immediately behind these bins and in the upper portion of the van are generators 70 and 71 connected through cables 72 to various electrical outlets which may be conveniently placed within and outside of said van. Mounted in a compartment just below the generators is an air-compressor 73 which may be used for many different purposes during repair and maintenance of vehicles including inflating of tires, operating greasing equipment, operating air-driven tools, activating means for raising and lowering the jack means of the rack and for any other use which may be practical and desirable.

Rearwardly of the generator and air compressor compartments are a second series of bins 74 similar to bins 69. Access to bins 74 may be from the work compartment extending from such bins to the end of the van.

Various devices may be placed within the work space or compartment such as test equipment 75, wheel balancing devices 76 and tire changing devices 77. Some or all of this equipment may be mounted on rails or trackways 78. Work benches 79 may also be provided to assist in the various maintenance and repair work being carried on by the mobile service unit.

Also if desired, a foldable extension platform 80 may be provided to give more working floor space to the shop area. The rear portion 3 of the van 1 opens to give access to the interior work area.

In operation, the mobile service unit 1 with racks mounted on either side thereof in folded transport position is moved into the desired location and parked. Power means 28 and 29 are then activated in unison to extend cables 32 and 33 thereby allowing the rack attached to such cables to fold about pivot points 81, 82 and 83 from a generally vertical to a generally horizontal position. As the rack approaches the horizontal position jack support plates 52, 53, 54, 67, 68 and 63 are placed in such a position that they receivably engage male portions 49, 50, 51, 34, 35 and 36.

Cables 32 and 33 are now removed from vehicle support channel 26 so that there is no obstruction in the area in which the vehicle to be maintained or repaired is to be placed.

The vehicle to be serviced or repaired then moves up either ramps 55 and 84, or 56 and 85 and on to vehicle support channels 26 and 27. Nevt the jacks, whether mechanically, hydraulically or pneumatically operated, which are mounted within slide members 11, 12 and 13 and jack means 23, 24 and 25 are activated to raise the vehicle to a convenient height so that the desired maintenance or repair may be carried on.

Once such repair or maintenance has been completed the jack means are again activated to lower the vehicle to loading position whereupon such vehicle may be removed from the ramp so that the process may be repeated.

When it is desired to move the mobile service unit to another location, all that is necessary is that ramps 55, 56, 84 and 85 be folded against or removed from the vehicle support channels 26 and 27. Cables 32 and 33 are then attached to vehicle support channel 26 and power means 28 and 29 activated in unison to fold the rack against the side of the van in transport position. Jack support plates 52, 53, 54, 67, 68 and 63 may be removed and the mobile service van unit is now ready to be moved to a new location of operation.

It is obvious from the foregoing description that the present invention makes it possible not only to maintain, but to repair vehicles without having the expense and long delay necessary in installing fixed facilities to accomplish these ends. Further, the present invention is not limited to light vehicles such as small automobiles, but is adapted to be used in conjunction with construction equipment, military vehicles and other large, relatively heavy equipment as well as vehicles falling within the automobile category. It is also obvious that the present invention embodies a completely self-contained mobile service repair and maintenance facility which is capable of being moved from place to place with a minimum of effort and with a minimum loss of time.

The present invention may be carried on in other specific ways than those herein set forth without departing from the spirit and essential characteristics of the invention. The present embodiments are therefore to be considered in all respects as illustrative and not restrictive and all changes coming within the meaning and equivalency range of the appended claims are intended to be embraced therein.

What is claimed is:

1. A mobile maintenance and repair facility comprising a generally rectangular shaped van, at least two channel members vertically mounted on one side of said van, slide members slidably mounted within said channel members, horizontally disposed bracket means fixedly secured to said slide members, sleeve members pivotably connected to said bracket means, girders slidably mounted within said sleeves, a first vehicle support channel perpendicularly disposed and fixedly connected to said sleeve members, a second vehicle support channel mounted parallel to said first support channel and perpendicularly disposed and fixedly connected to said girders, a first set of jack means perpendicularly disposed and fixedly secured to one end of said girders, a second set of jack means integrated into said slide members for moving said vehicle support channels vertically, at least one power means fixedly secured to the top of said van, cable drum means operatively connected to said power means, cable means windedly secured at one end to said drum means and releasably secured to said second vehicle support channel at the other end whereby said vehicle support channel and attached structure may be folded from a generally horizontally disposed position to a generally vertically disposed position.

2. The device of claim 1 in which the power means is an electrically operated winch.

3. The device of claim 1 in which the vehicle support channels are parallelly adjustable whereby vehicles of varing thread widths may be accommodated by said facility.

4. A mobile service unit comprising a van having a plurality of sides; a plurality of laterally spaced vertical channel members mounted on one side thereof; a plurality of slide members each being slidably mounted in a respective one of said channel members; a first plurality of jack means each being individually connected to a respective one of said slide members in said channel members; a plurality of vehicle supporting girders being individually and pivotally connected at one end to respective ones of said slide members; a second plurality of jack means individually connected at the end opposite said one end to respective ones of said girders, said first and second plurality of jack means cooperating to raise and lower said girders together when horizontally disposed to provide means for supporting vehicles thereon; and means for pivotally moving said girders from a substantial horizontal operating position to a substantially vertical transport position and return.

5. The device of claim 4 wherein each jack means is comprised of a bearing member having a threaded opening therein, said bearing member being integrally connected to a segment of said girder; a helically threaded shaft being threadably received by said bearing member; a pinion gear fixedly secured to said helical shaft; a worm gear threadably engaging said pinion gear; and means for rotating said worm gear whereby upon the rotation thereof said rack may be raised and lowered vertically.

6. The device of claim 4 wherein the means for pivotally moving each of said girders is comprised of an electrically operated winch being mounted on said van and a cable having a length thereof being wound on said winch with the remainder extending to and being removably connected with said girder.

7. The device of claim 4 including a plurality of vehicle support channels being parallelly arranged with respect to each other and being perpendicularly disposed to and fixedly connected to said girders.

8. The device of claim 7 wherein each jack means is comprised of a bearing member having a threaded opening therein, said bearing member being integrally connected to a segment of said girder; a helically threaded shaft being threadably received by said bearing member; a pinion gear fixedly secured to said helical shaft; a worm gear threadably engaging said pinion gear; and means for rotating said worm gear whereby upon the rotation thereof said rack may be raised and lowered vertically.

References Cited by the Examiner

UNITED STATES PATENTS

| 2,106,878 | 2/38 | Sinclair | 187—9 |
| 2,653,678 | 9/53 | Lehrman | 187—9 |
| 2,792,079 | 5/57 | Gibson | 187—9 |

SAMUEL F. COLEMAN, *Primary Examiner.*